United States Patent Office 3,315,846
Patented Apr. 25, 1967

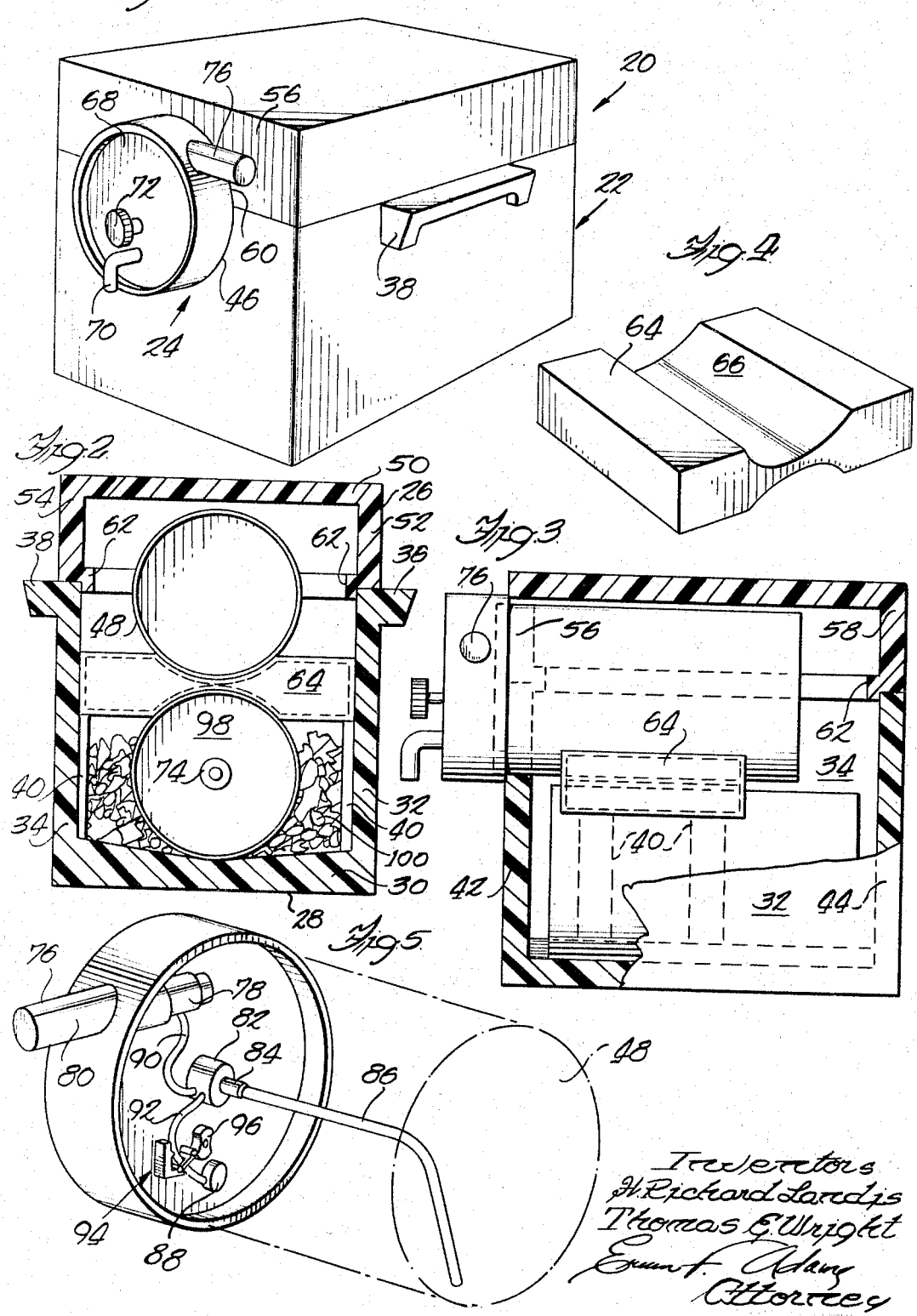

3,315,846
LIQUID COOLING AND DISPENSING DEVICE
H. Richard Landis, 5200 Stony Creek Drive, Oak Lawn, Ill. 60453, and Thomas E. Wright, 6862 Lode Drive, Worth, Ill. 60482
Filed June 24, 1965, Ser. No. 466,712
1 Claim. (Cl. 222—130)

This invention relates generally to a liquid cooling and dispensing device and more particularly to a portable system having an insulated unit for holding cylindrical-shaped liquid-filled containers and a dispensing apparatus.

The recent national demand for draft beer which may be served in the home has precipitated a requirement for draft beer which may be sold and stored in convenient size cans which are expendable. A liquid dispensing apparatus connected to these cans for drawing the liquid, a preferred such apparatus being disclosed and claimed in my prior pending patent application Ser. No. 452,799, filed May 3, 1965. These ordinary cans, however, are not self-insulating to an extent that the beer will be kept during storage and serving at the proper temperature. Moreover, the abovementioned preferred liquid dispensing apparatus is adapted to be used on a can which is held in a lying position during the dispensing operation. It has also been deemed desirable to provide an insulated device for storing and holding the beer containers during dispensing which is portable so that it may be taken on outdoor picnics, barbecues and the like.

Accordingly, it is an object of the present invention to provide a portable liquid cooling and dispensing device, having an insulated unit for holding cylindrical-shaped liquid-filled containers, at least one of the containers being positioned so that liquid may be easily dispensed therefrom.

It is another object of this invention to provide a portable device of the above-stated type wherein the insulated unit holds two containers stored lying on their side, the upper container supported by a cradle and having its forward end in registry with a hole in the front wall of the unit to which may be attached the liquid dispensing apparatus.

It is still another object of this invention to provide a portable insulated liquid cooling and dispensing device having an insulated unit for holding liquid containers and ice and a dispensing apparatus mounted on one of the containers for dispensing liquid therefrom.

FIGURE 1 is a perspective view of a liquid cooling and dispensing device constructed in accordance with the present invention;

FIGURE 2 is a front elevational section view of the device shown in FIGURE 1;

FIGURE 3 is a side elevational section view of the device shown in FIGURE 1;

FIGURE 4 is a cradle for supporting a cylindrical-shaped container in a lying position; and FIGURE 5 is a rear perspective view of a liquid dispensing apparatus.

Referring now to FIGURE 1, there is shown a liquid cooling and dispensing device 20 generally comprising an insulated unit 22 for storing and holding several cylindrical-shaped liquid containers or cans, and a means 24 for dispensing liquid from the containers.

As seen in FIGURES 2 and 3, the insulated unit 22 comprises an upper housing 26 and a lower housing 28. The lower housing 28 has a bottom wall 30, the upper surface of which is slightly concave for reasons to be explained more fully hereinafter. A pair of spaced apart side walls 32 and 34 extend upwardly from opposite sides of the bottom wall 30. On the outer surface of side walls 32 and 34 and near their upper edge are mounted handles 36 and 38, respectively. On the inner surface of the side walls are located cradle support means 40, attached thereto or formed integrally therewith. A pair of spaced apart front and rear end walls 42 and 44, respectively, as seen in FIGURE 3, extend upwardly between the edges of side walls 32 and 34. The front end wall 42 has a cut-out 46 formed in the upper edge of the wall. The cut-out 46 is shaped so as to fit closely around one portion of the cylindrical wall of a cylindrical-shaped container, such as can 48. In this manner, the cut-out edge 46 will support a liquid container 48 in a lying or horizontal position. As may be seen in FIGURE 2, the lower housing 28 has a depth sufficient to accommodate a second container beneath container 48 when the latter is in a dispensing position.

The upper housing 26 comprises a top wall 50 and a pair of spaced apart side walls 52 and 54 depending from opposite sides thereof. A pair of front and rear spaced apart end walls 56 and 58, respectively, depend downwardly from top wall 50 in between the edges of side walls 52 and 54. As seen best in FIGURE 1, the lower edge of front end wall 56 has a cut-out 60 so as to closely fit around the cylindrical wall of liquid container 48. Cut-out edges 46 and 60 together form a circular hole in the front wall when upper housing 26 is positioned on lower housing 28. The side and end walls of upper housing 26 have an inset portion 62 on the lower edges for engaging the walls of lower housing 28.

The walls of insulated unit 22 are formed of a light-weight heat-insulating material. This material is preferably foamed polystyrene, such as "Styrofoam."

A cradle 64 for supporting a can-like container is shown in FIGURE 4. The upper and lower surfaces of cradle 64 have cylindrically concave surfaces, such as upper surface 66. The cradle 64 is adapted to be placed within insulated unit 22 in a substantially horizontal position and supported by cradle supporting means 40 so as to maintain container 48 in registry with the cut-out opening in the front end walls of the upper and lower housings.

The means 24 for dispensing liquid from the liquid container comprising a cylindrically shaped base 68 adapted to fit over the end portion of a can-like container and to be secured thereto. Extending from the front surface of base 68 is a spigot 70 and handle 72 for selectively drawing liquid from container 48. As seen best in FIGURE 5, the dispensing means 24 is shown mounted on a cylindrical-shaped container 48. The can 48 has one flat end thereof, as shown on the other identical container in FIGURE 2, with a frangible sealing element 74 centrally located therein. The dispensing means 24, as seen in FIGURE 5, includes a high pressure gas source 76 which may be contained in a cartridge (not shown) and in fluid communication with a gas regulator 78 by means of a cartridge holder 80. Also mounted on the rear surface of base 68 is a fluid distribution housing 82 having extending therefrom a pair of tubes 84 and 86. Tube 86 is an elongated tube having a bent portion at the free end thereof so that the end of the tube is in close proximity to the cylindrical wall of container 48.

Extending from the rear surface of base 68 is the rearward portion 88 of spigot 70. A gas line 90 interconnects gas regulator 78 and a passage (not shown) in fluid distribution housing 82. A liquid carrying line 92 interconnects a liquid passage (not shown) in fluid distribution housing 82 with the rear portion 88 of spigot 70. Within fluid distribution housing 82 gas line 90 is in fluid communication with tube 84 and liquid carrying line 92 is in fluid communication with elongated tube 86. A pinch-type valve mechanism 94 is mounted on the rear surface of base 68 adjoining liquid carrying line 92 for selectively opening and closing line 92 by means of a cam 96 attached to handle 72.

While the means for dispensing liquid mounted on the liquid container is described with particularity herein, it is to be understood that the means for dispensing liquid from the container may be any type of pressurizing and dispensing device for selectively drawing the liquid.

Use and operation of the portable liquid cooling and dispensing device 20 may be described as follows. The upper housing 26 is removed from the insulated unit 22 and a cylindrical-shaped liquid container 98 is placed resting on bottom wall 30 of lower housing 28. To maintain the container at a low temperature, ice 100 is positioned on all sides of container 98. When ice 100 melts, the water will run to the center of bottom wall 30 so as to surround container 98 and thereby maintain the low temperature thereof. The cradle 64 is then positioned above the lower container 98 so that the edges thereof rest on cradle supporting means 40. An upper container 48 is placed on the cylindrical-shaped surface 66 of cradle 64 with the forward end portion of the container resting on cut-out edge 46 of front end wall 42. Dispensing means 24 is then positioned over the end portion of container 48 and secured thereto. In positioning base 68 on container 48, tube 86 will pierce frangible sealing element 74 so that tubes 84 and 86 will protrude interiorly of can 48. A high pressure gas cartridge is positioned in holder 76 in fluid communication with gas regulator 78 and, through gas line 90 and tube 84, will pressurize the inside of container 48. The pressurized liquid will flow through tube 86 into liquid carrying line 92. Handle 72 may be positioned so that cam 96 opens valve mechanism 94 allowing liquid to flow through spigot 70 into a beverage container. Handle 72 may be rotated so that cam 96 closes pinch-type valve mechanism 94 preventing pressurized liquid from being dispensed through spigot 70.

When liquid from upper can 48 is entirely dispensed, dispensing means 24 may be detached therefrom and upper can 48 may be disposed of. The lower can 98 may then be positioned on cradle 64 and dispensing means 24 attached thereto for drawing the liquid therefrom. If desired, upon moving the cool lower can 98 into a dispensing position, another liquid container may be positioned on the bottom of dispensing unit 22.

While a particular embodiment of the present invention has been shown and described, it will be obvious to those skilled in the art that changes and modifications may be made without departing from the invention in its broader aspects. Accordingly, the aim in the appended claim is to cover all such changes and modifications as fall within the true spirit and scope of the invention.

We claim:

A portable insulated unit for holding cylindrical-shaped liquid-filled containers including an upper dispensing container supported in a lying position and a lower storage container supported in a lying position, comprising in combination:

(a) a lower housing including
  (1) a bottom wall having a slightly concave inner surface forming a support for said lower storage container,
  (2) a pair of spaced apart side walls, extending upwardly from opposite sides of said bottom wall and attached thereto, each wall having an integral cradle support means formed on the inner surface,
  (3) a pair of spaced apart end walls extending upwardly from said bottom wall between the edges of said side walls, and attached thereto, one of said end walls being a front wall and having a semi-circular cut-out formed in its upper edge,
(b) an upper housing including
  (1) a top wall,
  (2) a pair of spaced apart side walls depending downwardly from opposite sides of said top wall and attached thereto,
  (3) a pair of spaced apart end walls depending downwardly from said top wall between the edges of said side walls and attached thereto, one of said end walls being a front wall and having a semi-circular cut-out in its lower edge matching the cut-out in said lower housing so that a circular hole is formed in the front wall of said unit when said upper and lower housings are engaged,
  (4) the lower edges of said upper housing side walls and rear wall having inset edges for engaging the lower housing walls upper edges,
(c) a cradle for supporting said upper dispensing cylindrical-shaped container lying on its side at a height above said bottom wall so that the flat end portion of said upper dispensing container is in registry with said circular cut-out in said front wall, said cradle supported by said lower housing side wall cradle support means, and
(d) all of the walls of said unit being formed of a material having a low heat transfer coefficient.

References Cited by the Examiner

UNITED STATES PATENTS

| 192,539 | 6/1877 | Staugler | 62—398 |
| 1,922,995 | 8/1933 | Wallach | 222—146 X |
| 2,074,365 | 3/1937 | Clifford | 222—146 X |
| 2,325,356 | 7/1943 | Alvear | 217—111 |
| 2,552,641 | 5/1951 | Morrison | 220—9 |
| 2,792,692 | 5/1957 | Bryan | 62—400 X |
| 2,998,162 | 8/1961 | Varnell | 222—146 X |
| 3,065,885 | 11/1962 | Chatten | 222—400.7 |
| 3,237,810 | 3/1966 | Gran | 222—131 X |

RAPHAEL M. LUPO, *Primary Examiner.*